United States Patent
Cavarec et al.

(10) Patent No.: US 7,259,485 B2
(45) Date of Patent: Aug. 21, 2007

(54) MAGNETIC BRAKE FOR WINDOW COVERING POWERED BY DC MOTOR

(75) Inventors: Pierre-Emmanuel Cavarec, May Land (FR); Winston Glenn Walker, Littleton, CO (US)

(73) Assignee: Somfy SAS, Cluses (FR)

( * ) Notice: Subject to any disclaimer, the term of this patent is extended or adjusted under 35 U.S.C. 154(b) by 15 days.

(21) Appl. No.: 11/223,186

(22) Filed: Sep. 9, 2005

(65) Prior Publication Data

US 2006/0006751 A1 Jan. 12, 2006

Related U.S. Application Data

(63) Continuation-in-part of application No. 10/862,745, filed on Jun. 7, 2004, now Pat. No. 6,967,418, and a continuation-in-part of application No. 10/786,351, filed on Feb. 25, 2004, now Pat. No. 7,002,310, which is a continuation-in-part of application No. 10/445,149, filed on May 23, 2003, now Pat. No. 6,794,778.

(51) Int. Cl.
*H02K 49/10* (2006.01)
*E06B 9/32* (2006.01)

(52) U.S. Cl. .................. 310/77; 310/93; 310/152; 160/168.1 P; 188/267

(58) Field of Classification Search .......... 310/77, 310/92–93, 152, 154.1, 156.1; 160/168.1 P, 160/DIG. 16–DIG. 17; 192/84.3; 188/267
See application file for complete search history.

(56) References Cited

U.S. PATENT DOCUMENTS

| | | | |
|---|---|---|---|
| 2,341,440 A | 2/1944 | Hammer | 160/298 |
| 3,104,700 A | 9/1963 | Polsky | 160/298 |
| 3,352,349 A | 11/1967 | Hennequin | 160/171 |
| 3,732,447 A | 5/1973 | Perhats | 310/78 |
| 4,103,191 A | 7/1978 | Kawamura et al. | 310/49 R |
| 4,251,758 A * | 2/1981 | Pedersen et al. | 318/254 |
| 4,522,244 A | 6/1985 | Brolin | 160/170 |
| 4,623,012 A | 11/1986 | Rude et al. | 160/243 |
| 4,922,198 A | 5/1990 | Sandhagen et al. | 324/207.13 |
| 5,038,087 A | 8/1991 | Archer et al. | 318/469 |
| 5,087,845 A | 2/1992 | Behrens | 310/77 |
| 5,184,660 A | 2/1993 | Jellic | 160/171 |
| 5,228,491 A | 7/1993 | Rude et al. | 160/171 |
| 5,444,318 A * | 8/1995 | Stumpf | 310/77 |
| 5,444,339 A | 8/1995 | Domel et al. | 318/77 |
| 5,467,266 A | 11/1995 | Jacobs et al. | 700/56 |
| 5,542,506 A | 8/1996 | McMichael et al. | 188/267 |
| 5,543,672 A | 8/1996 | Nishitani et al. | 310/77 |
| 5,714,820 A | 2/1998 | Mitsuhashi et al. | 310/105 |
| 5,848,634 A | 12/1998 | Will et al. | 160/310 |
| 6,095,223 A | 8/2000 | Rossini et al. | 160/107 |

(Continued)

FOREIGN PATENT DOCUMENTS

DE 3232820 3/1984

(Continued)

*Primary Examiner*—Burton Mullins
(74) *Attorney, Agent, or Firm*—Frommer Lawrence & Haug LLP; Ronald R. Santucci

(57) ABSTRACT

A braking magnet is attached to the housing of a motor of a motorized component such as a window covering. With this structure the motor is braked from turning under the weight of the window covering when deenergized.

10 Claims, 3 Drawing Sheets

U.S. PATENT DOCUMENTS

| | | | |
|---|---|---|---|
| 6,332,491 B1 | 12/2001 | Rossini | 160/107 |
| 6,714,733 B2 | 3/2004 | Kobayashi | 396/133 |
| 6,870,338 B2 | 3/2005 | Walker et al. | 318/466 |
| 6,924,615 B2 | 8/2005 | Cavarec et al. | 318/466 |

FOREIGN PATENT DOCUMENTS

| | | |
|---|---|---|
| DE | 29509638 U1 | 11/1996 |
| EP | 0381643 A1 | 8/1990 |
| EP | 0859224 A2 | 8/1998 |
| JP | 29028 | 2/1983 |
| JP | 109484 | 6/1985 |
| JP | 192987 | 8/1989 |
| JP | 363495 | 12/1992 |

* cited by examiner

MAGNETIC BRAKE FOR WINDOW COVERING POWERED BY DC MOTOR

RELATED APPLICATIONS

This is a continuation-in-part of U.S. patent application Ser. No. 10/862,745 (issued under U.S. Pat. No. 6,967,418), filed on Jun. 7, 2004 titled "Magnetic Brake For Powered Window Covering", which is a continuation-in-part of U.S. patent application Ser. No. 10/445,149 (issued under U.S. Pat. No. 6,794,778), filed on May 23, 2003 titled "Braking System for Powered Window Covering" and U.S. patent application Ser. No. 10/786,351 (issued under U.S. Pat. No. 7,002,310), filed Feb. 25, 2004 titled "Piezo-Based Encoder with Magnetic Brake for Powered Window Covering" from which priority is claimed and which are incorporated herein by reference.

FIELD OF THE INVENTION

The present invention relates generally to motorized window coverings, awnings, security screens, projection screens, and the like.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The present assignee has also provided systems for determining the position of the window coverings based on counting motor pulses, and for braking the motor from turning when it is not energized. By knowing the position of the window coverings, features such as automatic repositioning the window covering to a preset position can be provided. The present invention likewise provides simple structure and methods for braking an object in the absence of power while minimizing the effects of the brake during motor operation.

SUMMARY OF THE INVENTION

A powered assembly comprises one object that can be moved between a first configuration and a second configuration. A DC motor is provided. It includes a stator and a rotor separated by an air-gap, the stator comprising a housing and two stator magnets producing in the air-gap a main magnetic field in a first direction and the rotor rotating about a rotor axis. An actuator is coupled to the rotor of the motor and the object to move the object when the motor is energized. At least one additional magnet is disposed on the housing and externally to the housing in such a way that the at least one additional magnet and the rotor are magnetically coupled. The at least one additional magnet produces in the air-gap an auxiliary magnetic field in a second direction substantially perpendicular to the first direction.

The second direction may be substantially perpendicular to the rotor axis.

The motor may be powered by at least one dc battery.

The at least one magnet may be disposed in a recess formed in the housing.

In another aspect, the powered assembly comprises one additional magnet and a magnetic field closing concentrator. The additional magnet is sandwiched between the magnetic field closing concentrator and the housing and the magnetic field closing concentrator is oriented in such a way that the auxiliary magnetic field has in the air-gap two radial components that are anti-parallel.

The object may be selected from the group consisting of window coverings, awnings, skylight coverings, curtains, and screens.

In still another aspect, a method for operating an object that can be moved between a first configuration and a second configuration, includes providing a DC motor including a stator and a rotor separated by an air-gap, the stator comprising a housing and two stator magnets producing in the air-gap a main magnetic field in a first direction and the rotor rotating about a rotor axis, coupling the rotor to the object such that the object is moved when the motor is energized, disposing the at least one additional magnet on the housing and externally to the housing in such a way that the at least one additional magnet and the rotor are magnetically coupled, and orienting the at least one additional magnet such that it produces in the air-gap an auxiliary magnetic field in a second direction substantially perpendicular to the first direction.

The method may also include forming at least one recess in the housing of the motor, and disposing the at least one magnet in the at least one recess.

The method may also include disposing a magnetic field closing concentrator on one magnet, the magnetic field closing concentrator being oriented in such a way that the auxiliary magnetic field has in the air-gap two radial components that are anti-parallel.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
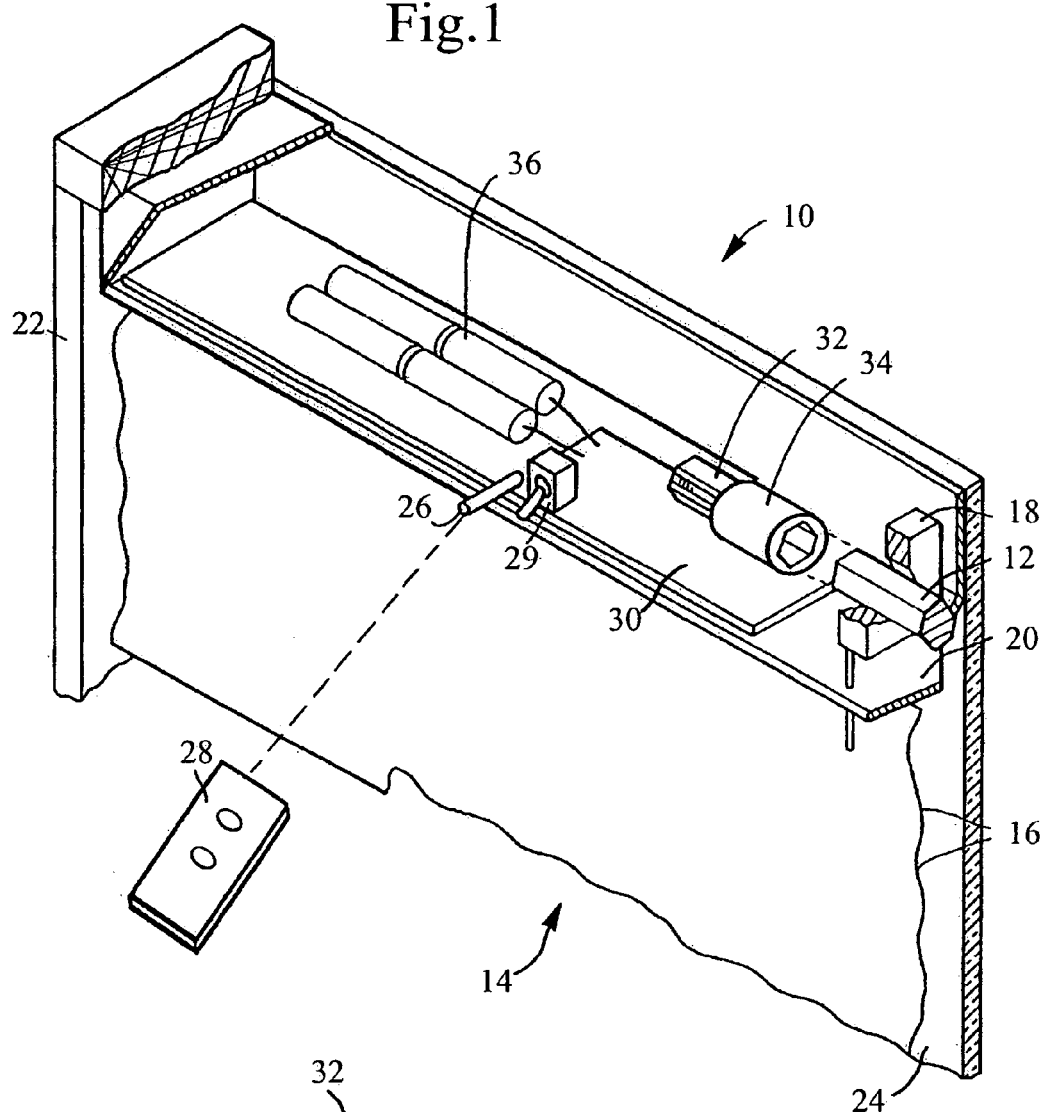
FIG. 1 is a perspective view of a window covering actuator, shown in one intended environment, with portions of the head rail cut away.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals.

FIG. 1 shows that a small, lightweight electric motor 32 is coupled to a gear enclosure 34, preferably by bolting the motor 32 to the gear enclosure 34. The gear enclosure 34 is keyed to the rod 12, so that as the gears in the gear enclosure 34 turn, the rod 12 rotates.

It is to be understood that the motor 32 is electrically connected to the circuit board 30. To power the motor 32, one or more (four shown in FIG. 1) primary dc batteries 36, such as type M alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor 32 is closed to energize the motor 32 and move the window covering open or closed in accordance with the signal generated by the signal generator 28, under control of the processor on the electronic circuit board 30. When the motor is deenergized, at least one braking magnet disclosed below advantageously brake the motor from turning under the weight of the window covering 14.

Figure 2:
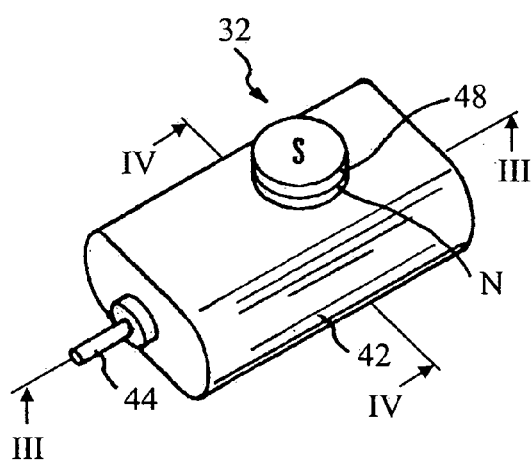
FIG. 2 is a perspective view of a first embodiment of the motor showing one braking magnet.
Figure 3:
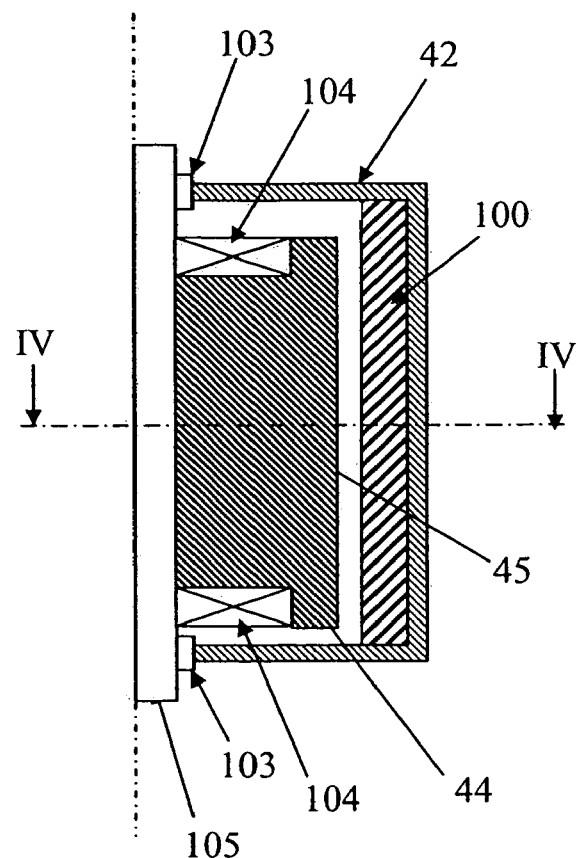
FIG. 3 is a half longitudinal cross-section of the motor shown in FIG. 1.
Figure 4:
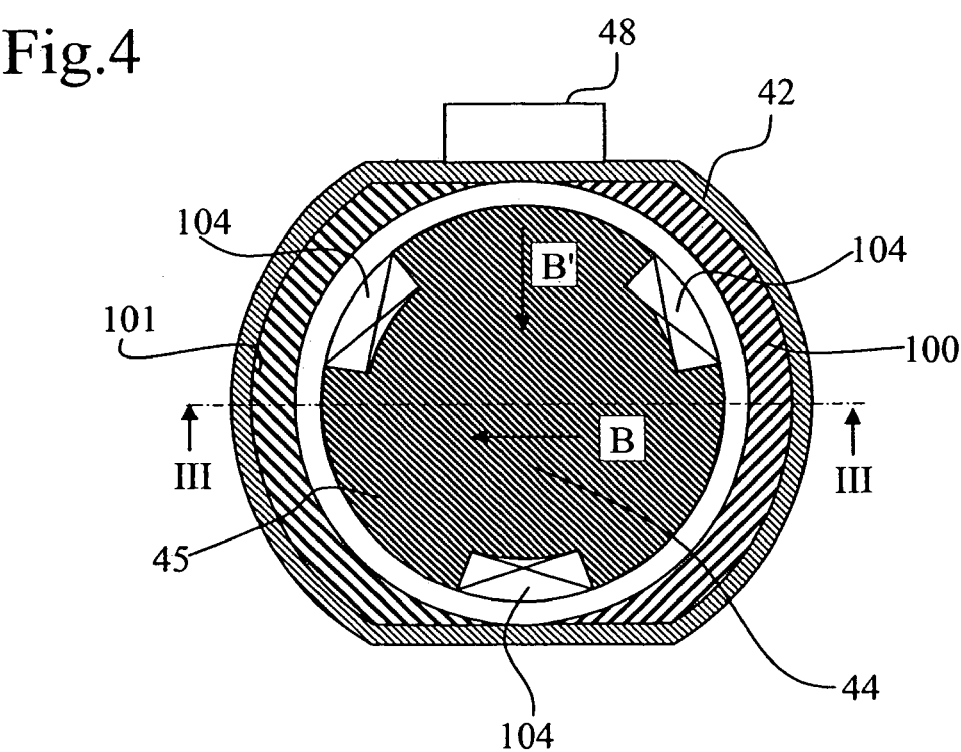
FIG. 4 is a transversal cross-section of the motor shown in FIG. 1.

Now referring to FIGS. 2, 3 and 4, in one non-limiting implementation a DC motor 32 includes a stator comprising a motor housing 42 and two stator magnets 100, 101 producing a main magnetic field whose direction is represented by an arrow B on FIG. 4. The motor also includes a rotor 44 that may rotate within the stator, the rotor being mechanically linked to the stator via bearings 103. The rotor 44 may have, e.g., three poles 45, each of which is surrounded with an electrical winding 104. In the case of a motor with three poles, a delta connection is made on the windings, and each node of the delta is connected to one blade of a collector (not represented). The rotor includes a shaft 105 that is mechanically linked to the actuator described above.

It appeared to be useful to act upon the rotor for increasing the reluctant torque of an already existing motor. Such an increase of the reluctant torque may be obtained with the use of a permanent magnet. This permanent magnet 48 is disposed on the housing 42 of the motor and externally to the housing. It has a braking effect on the rotor. Preferably, the magnet 48 is attached to the housing 42 on a flat portion thereof by, e.g., solvent bonding the magnets to the housing 42. In this position, it produces an auxiliary magnetic field whose direction in the air-gap, represented by an arrow B' is perpendicular to the main magnetic field B. With such a structure, the electromagnetic torque of the motor is not too much reduced. However, the electromagnetic structure of the motor is no longer symmetric and thus a rotation direction of the rotor is privileged. This can be advantageous in some circumstances. Nevertheless, it impacts the switching conditions of the collector and brushes and may reduce the life span of the motor.

With this structure, the braking magnet 48 is magnetically coupled to the rotor 44 sufficiently to stop it from rotating when the motor 32 is deenergized.

In order to increase the reluctant torque, two braking magnets may be disposed on the housing in two opposite positions relatively to the axis of the motor. With these two magnets, six low-reluctant positions of the rotor are obtained.

Figure 5A:
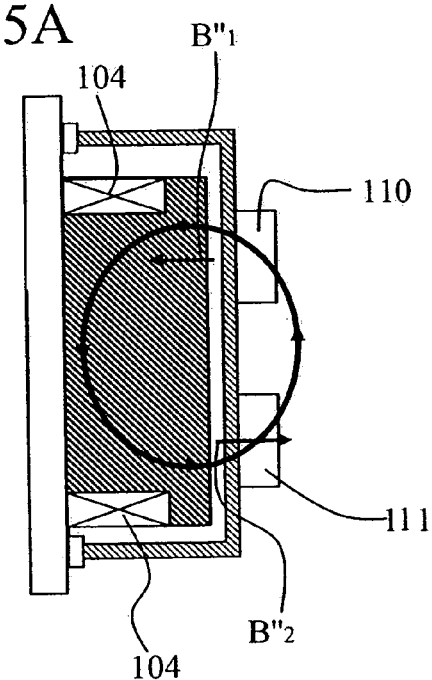
FIG. 5A is a longitudinal cross-section of a second embodiment of the motor in which the braking magnets are facing one magnetic pole.
Figure 5B:
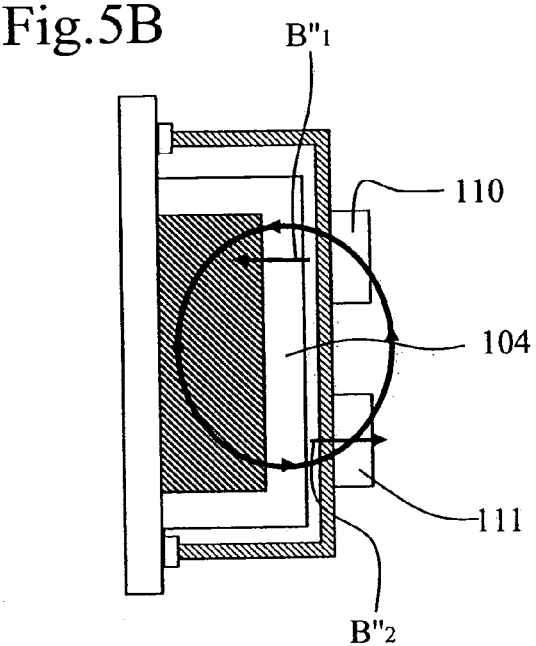
FIG. 5B is a longitudinal cross-section of a second embodiment of the motor in which the braking magnets are facing one electrical winding.

In a second embodiment of the motor represented on FIG. 5A, two permanent braking magnets 110, 111 are disposed side by side on the housing of the motor, the magnet being disposed alongside the rotor and in such away that the north pole of the first magnet 110 and the south pole of the second magnet are against the housing. The loop on FIG. 5A represents the auxiliary magnetic field produced by the two magnets. As represented on FIG. 5B, because of the symmetries of this structure, the effects of the radial anti-parallel components B"1 and B"2 of the auxiliary magnetic field, acting in the air-gap upon the currents circulating in the electric wires 104, offset each other. Thus, the effect of the fitting of the magnets does not impact the electromagnetic torque. When the motor 32 is energized, the average magnetic field effect on the rotor generated by the magnets 110, 111 is at a null, thereby causing little or no drag on the rotor 44 as it rotates.

In order to minimize the air-gap between the braking magnets and the rotor, the braking magnets must be attached to a flat side of the motor. The braking magnets may be attached by, e.g. solvent bonding.

Preferably, a magnetic concentrator, such as an elongated ferromagnetic bar, can be placed on top of the braking magnets 110, 111 to sandwich them between the concentrator and the housing and thereby close the magnetic field beyond the braking magnets. This serves to strengthen the magnetic braking field inside the motor, permitting the use of smaller magnets if desired. The concentrator can have shapes matching the contours of the braking magnets. The length of the concentrator can equal the diameters of the braking magnets plus the distance between the braking magnets.

Figure 6:
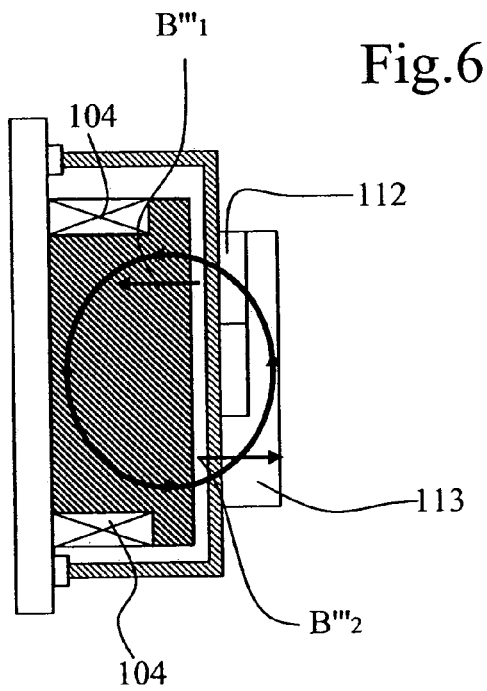
FIG. 6 is a longitudinal cross-section of a third embodiment of the motor.

In a third embodiment of the motor represented on FIG. 6, only one permanent braking magnet 112 is disposed on the housing. It is sandwiched between a concentrator 113 and the housing. The concentrator is oriented in such a way that the auxiliary magnetic field circulation is similar to the above embodiment. In particular, two anti-parallel components B'''1 and B'''2 are located in the air-gap. Such a fitting of the braking magnet and the concentrator has the same effects as the fitting disclosed in the above embodiment.

In any case, shallow recesses that are preferably configured to match the contours of the braking magnets may be formed in the housing of the motor (but not through the case). With this structure, the gap between the magnets and the rotor is shortened and, hence, the braking force of the magnets on the motor strengthened.

While the particular MAGNETIC BRAKE FOR WINDOW COVERING POWERED BY DC MOTOR as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

The invention claimed is:

1. A powered assembly, comprising:
    at least one object that can be moved between a first configuration and a second configuration;
    at least one DC motor including a stator and a rotor separated by an air-gap, the stator comprising a housing and two stator magnets producing in the air-gap a main magnetic field in a first direction and the rotor rotating about a rotor axis;
    at least one actuator coupled to the rotor of the motor and the object to move the object when the motor is energized; and
    at least one additional magnet disposed on the housing and externally to the housing in such a way that the at least one additional magnet and the rotor are magnetically coupled, the at least one additional magnet producing in the air-gap an auxiliary magnetic field in a second direction substantially perpendicular to the first direction.

2. The powered assembly of claim 1, wherein the second direction is substantially perpendicular to the rotor axis.

3. The powered assembly of claim 1, wherein the motor is powered by at least one dc battery.

4. The powered assembly of claim 1, wherein the at least one magnet is disposed in a recess formed in the housing.

5. The powered assembly of claim 1, comprising one additional magnet and a magnetic field closing concentrator, the additional magnet being sandwiched between the magnetic field closing concentrator and the housing and the magnetic field closing concentrator being oriented in such a way that the auxiliary magnetic field has in the air-gap two radial components that are anti-parallel.

6. The powered assembly of claim 1, wherein the object is selected from the group consisting of window coverings, awnings, skylight coverings, curtains, and screens.

7. A method for operating an object that can be moved between a first configuration and a second configuration, the method comprising:
    providing a DC motor including a stator and a rotor separated by an air-gap, the stator comprising a housing and two stator magnets producing in the air-gap a main magnetic field in a first direction and the rotor rotating about a rotor axis;
    coupling the rotor to the object such that the object is moved when the motor is energized;
    disposing the at least one additional magnet on the housing and externally to the housing in such a way that the at least one additional magnet and the rotor are magnetically coupled, and;
    orienting the at least one additional magnet such that it produces in the air-gap an auxiliary magnetic field in a second direction substantially perpendicular to the first direction.

8. The method of claim 7, comprising:
    forming at least one recess in the housing of the motor, and
    disposing the at least one magnet in the at least one recess.

9. The method of claim 7, comprising:
    disposing a magnetic field closing concentrator on one magnet, the magnetic field closing concentrator being oriented in such a way that the auxiliary magnetic field has in the air-gap two radial components that are anti-parallel.

10. The method of claim 7, wherein the object is selected from the group consisting of window coverings, awnings, skylight coverings, curtains, and screens.

* * * * *